Bradford Stetson's Improvement in Turbine Water Wheels.

3866

REISSUED MAR 1 1870

Witnesses.

S. N. Piper.

L. N. Miller

Bradford Stetson.

by his attorney.

R. H. Eddy

United States Patent Office.

BRADFORD STETSON, OF UXBRIDGE, AND ELMER TOWNSEND, OF BOSTON, MASSACHUSETTS, ASSIGNEES OF BRADFORD STETSON.

*Letters Patent No.* 29,654, *dated August* 14, 1860; *reissue No.* 3,866, *dated March* 1, 1870.

IMPROVEMENT IN TURBINE WATER-WHEELS.

The Schedule referred to in these Letters Patent and making part of the same.

*To all persons to whom these presents may come:*

Whereas, Letters Patent No. 29,654, dated August 14, 1860, have been granted to us, BRADFORD STETSON, of Uxbridge, of the county of Worcester, and State of Massachusetts, and ELMER TOWNSEND, of Boston, of the county of Suffolk, and State aforesaid, for a new and useful invention having reference to Turbine Water-Wheels; such invention having been made by the said STETSON, and by him assigned to himself and the said TOWNSEND; and, whereas, we have petitioned for leave to surrender such patent, to correct one or more defects therein, and to have a new patent granted to us, on an amended or new specification, Now, therefore, we do hereby declare the said invention to be fully described as follows, reference being had to the accompanying drawings, which are to be considered as making part of this specification.

Of such drawings—

Figure 1 is a top view of the said turbine wheel and its flume or water-conductor.

Figure 2, a vertical central and transverse section of the same.

Figure 3, a horizontal section taken through the wheel, its annular gate, and flume.

Figure 1:
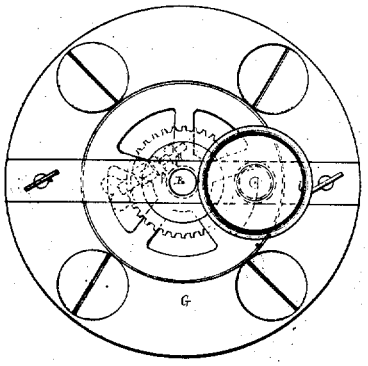

A denotes the turbine or water-wheel affixed to a vertical shaft, B, which is arranged within and concentrically with two tubular shafts, C D, the said water-wheel being composed of two open heads *a a*, placed parallel to one another, and at a suitable distance apart to admit a series of curved buckets, *b b b*, to be placed between them, as shown in the drawings.

Figure 3:
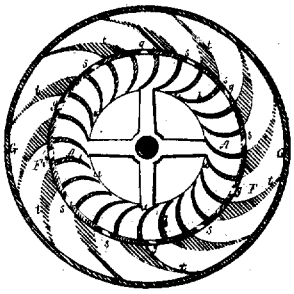
Figure 7:
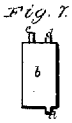

Each bucket is formed as shown in side view in Figure 7, and in section, as represented in fig. 3, it being constructed with three journals, *c d d*, two of which, viz., *c d*, extend from the upper end of the bucket, while the third projects from its lower end, as shown in the said figures.

Figure 4:
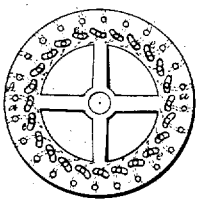
Figure 4 is a top view of the wheel or turbine.

The two journals *d d* turn in bearings made in the heads, while the third journal, *c*, passes through one of a series of curved slots *e e e*, arranged as shown in fig. 4.

Figure 5:
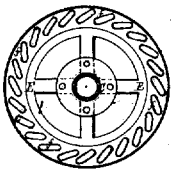
Figure 5 is a top view of the slotted wheel, which is arranged on top of the turbine, and serves to move its buckets in such manner as to increase or diminish their orifices of discharge.
Figure 6:
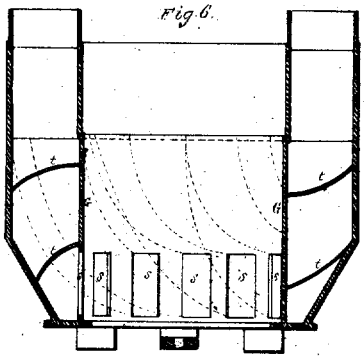
Figure 6 is a sectional view in elevation of the flume, taken so as to represent the mode of arranging its water-chutes.

The said journal *c* also passes into one of another series of slots, *f f f*, arranged in a wheel, E, as shown in fig. 5, that is, in such manner that, when the said wheel E is turned on its axis, it, by means of its slots, shall cause the buckets so to turn in their supports as to either approach toward or recede from one another, whereby their openings of discharge may be either diminished or increased in size.

Figure 8:
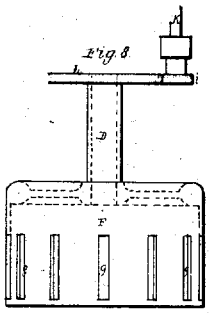

Surrounding the wheel is an annular gate, F, a side view of which is shown in fig. 8. It is furnished with a series of openings, *g g*, arranged in it as shown in the drawings. This is affixed to the outer shaft D, while the slotted wheel E is fastened to the second shaft C.

A gear-wheel, *h*, is carried by the shaft D, and engages with a pinion, *i*, fixed on a shaft, K, on whose upper end is a hand-wheel, *l*. By turning the hand-wheel, the gate may be revolved horizontally, so as either to open or close the flume-eduction passages.

Figure 2:
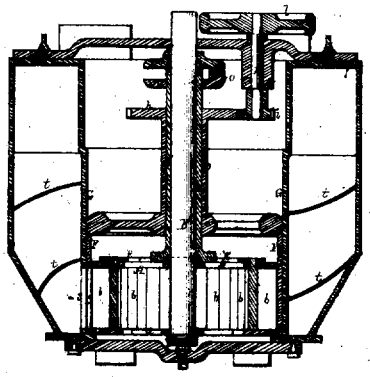

Furthermore, there are arranged on the two shafts B and C, in manner as shown in fig. 2, two disks, *m m*, one being affixed on each shaft.

Figure 9:
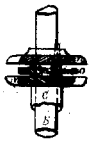

A tangent screw, *o*, turns in a projection, *p*, extended from one of the disks, and is screwed, and through another projection, *p'*, that extends from the other disk, the same being as shown in Figure 9, which is a sectional view of the disks, projections, and screw.

By applying a key to the head of the screw and turning the screw, motion may be imparted to the slotted wheel E, so as to cause it to turn and operate the buckets as described.

The gate works against the inner surface of the concentric annular flume G, which is constructed so as to surround the gate, the wheel, and the several shafts, as shown in figs. 1, 2, and 3, and is provided with a series of discharging-passages, *s s s*, disposed within its lowest part, and corresponding in number with those of the gate. Besides such, the flume has a series of chutes or transverse partitions, *t t t*, each of which is placed within the flume, and extends across it from side to side, and downward in a helix, as shown in the drawings. They serve to direct the water of the flume to the eduction-passages *u u u*, and so that it may impinge against each of the buckets in that direction, which will cause it operate with the greatest useful effect.

By means of the chutes, the water enters into the turbine in several streams, each of which is so isolated from the others, and governed in its direction by the chutes, as to enable it to operate without being injuriously affected by any of the other streams.

By applying the buckets to the wheel as specified, and by furnishing them with a means of moving them relatively to each other, so as either to increase or diminish their discharging-openings, we are enabled to retain the water against the buckets long enough for it to expend its power against them.

Although we may regulate the amount discharged from the flume, when that amount is decreased it will not operate with the best possible effect, unless the discharge-orifice of each bucket is diminished so as to prevent the water from escaping from the buckets too freely, for, when the discharging-opening of the bucket remains constant in size or area, much of the water that would impinge against the bucket with useful effect, escapes through the bucket without properly acting thereon.

What we claim as the invention of the said BRADFORD STETSON is as follows:

The slotted plate E and its shaft C, arranged with the wheel A and its shaft B, joining the two shafts B and C by the disks *m m* and screw *o*, connected as described, and having the plate E applied to the buckets, and the latter to the wheel-heads, as specified.

Also, the arrangement of the annular or tubular gate around and concentric with the wheel, and within and concentric with the flume or curb, as set forth.

Also, the arrangement of the annular or tubular gate and its operative mechanism within the curb, and with respect to the wheel arranged within and concentric with such curb, in manner as shown and explained.

Also the combination and arrangement of the gate F with the flume or curb of the wheel, the shaft C and the plate E applied to such wheel and its shaft B, the whole being substantially as explained and represented.

Also, the combination and the arrangement of the shaft D and the gate F with the flume or curb, the wheel, the shaft C, and the plate E applied to such wheel and its shaft B, the whole being substantially as described and represented.

BRADFORD STETSON.
ELMER TOWNSEND.

Witnesses:
R. H. EDDY,
S. N. PIPER.